UNITED STATES PATENT OFFICE.

ROBERT G. STEWART, OF NEWBURGH, NEW YORK.

COMPOSITION FOR REMOVING DRIED PAINT, VARNISH, AND LAC.

No. 931,519.　　　Specification of Letters Patent.　　　Patented Aug. 17, 1909.

Application filed November 10, 1908. Serial No. 461,924.

*To all whom it may concern:*

Be it known that I, ROBERT G. STEWART, a citizen of the United States, residing at No. 166 Montgomery street, in the city of Newburgh, county of Orange, and State of New York, have invented a new and useful Composition of Matter to be Used for Removing Dried Paint, Varnish, and Lac, of which the following is a specification.

My composition consists of a suitable ether, anilin, and an ingredient such as paraffin oil for retarding evaporation. It has been found that excellent results can be obtained with a composition formed of 200 parts acetic ether, 30 parts anilin, and 1 part paraffin oil.

The ethers referred to would embrace sulfuric ether, ethyl acetate, ethyl butyrate, amyl acetate, amyl butyrate, ethyl valerate and amyl valerate. The property required of the evaporation retarder such as the paraffin oil referred to is that it should be soluble in the ether and anilin to a slight extent only.

In this composition the ether acts directly upon the dried or oxidized oil in the paints and the dried gums and lacs in the varnish and dissolves them; as the ether evaporates it leaves deposited in the dissolved and softened oils or gums or lacs the anilin, which continues the dissolution commenced by the ether and, being a less volatile substance than the ether, keeps the oils, gums or lacs in a softened condition; the paraffin retards the evaporation of the ether upon its application. While the ether alone with the paraffin oil will form a paint and varnish solvent, yet the addition of the heavier solvent, anilin, not only increases the activity of the composition as a solvent but greatly prolongs and continues its effect.

The ingredients are to be thoroughly mingled by agitation.

I claim:

1. A composition for removing dried paints, varnish or lac, the said composition comprising a mixture of ether, anilin for prolonging the activity of the ether, and paraffin oil for retarding the evaporation of the ether when the composition is first applied.

2. The herein described composition for removing dried paints, varnish or lac, the said composition comprising a mixture of 200 parts acetic ether, 30 parts anilin, and 1 part paraffin oil.

In testimony whereof I have affixed my signature in the presence of two witnesses.

ROBERT G. STEWART.

Witnesses:
　WILLIAM T. SNIDER,
　CHARLES W. U. SNEED.